Patented Aug. 8, 1950

2,517,898

UNITED STATES PATENT OFFICE 2,517,898

METHOD FOR PREPARING AROMATIC ACYL FLUORIDES

Robert G. Linville, Wilmington, Del., assignor to E. I. du Pont de Nemours & Company, Wilmington, Del., a corporation of Delaware No Drawing. Application December 24, 1948, Serial No. 67,251

9 Claims. (Cl. 260—544)

This invention relates to improvements in the preparation of acyl fluorides and more particularly to a process for the preparation of aromatic acyl fluorides.

The known methods for preparing aromatic acyl fluorides involve indirect complicated procedures. For example, benzoyl fluoride has been prepared in the past by first making the acid chloride and then converting this to the fluoride by reaction with potassium hydrogen fluoride. Such methods are not feasible for use in the preparation of highly substituted aromatic acyl fluorides. There is thus a need for a direct method for preparing aromatic acyl fluorides from readily available materials.

It is an object of this invention to provide a a new method for preparing aromatic acyl fluorides. A further object is to provide a relatively simple and direct method for preparing aromatic acyl fluorides from readily available materials. A still further object is to provide a method for preparing substituted aromatic acyl fluorides. Other objects will appear hereinafter.

These objects are accomplished by the following invention which comprises reacting an aromatic diazonium fluoborate with carbon monoxide under anhydrous conditions. It has now been found that aromatic acyl fluorides can be prepared directly by the method which comprises contacting an aryldiazonium fluoborate with carbon monoxide under anhydrous conditions.

In one embodiment of this invention the aryldiazonium fluoborate is heated at 60° to 125° C. in an inert solvent, e. g., an alcohol or a hydrocarbon, with carbon monoxide under superatmospheric pressure, e. g. 200–1000 atm. Reaction times of from 1 to 8 hours or more are suitable under these conditions. The resulting aromatic acyl fluoride can be isolated from the reaction mixture by conventional means, e. g., by fractional distillation of the filtered reaction mixture.

In another embodiment of this invention, the carbon monoxide used is generated in situ from a metal carbonyl. In this case the aryldiazonium fluoborate is added gradually to an excess, e. g., 10 to 50% excess, of a metal carbonyl such as nickel carbonyl in the presence of an inert polar solvent, e. g., methanol, and an anhydrous acid such as hydrogen chloride, which facilitates the generation of carbon monoxide from the metal carbonyl. In this embodiment the reaction takes place at ordinary temperatures and under atmospheric pressure. The rate of addition of the aryldiazonium fluoborate is adjusted to provide a gradual reaction and to control the rate of generation of by-product gaseous materials. The reaction is substantially completed by the time all the aryldiazonium fluoborate has been added to the reaction mixture. The resulting aromatic acyl fluoride is isolated by fractional distillation of the filtered reaction mixture.

The aryldiazonium fluoborates used as starting materials in the process of this invention can be prepared from the corresponding aryl amines by diazotization of the amine hydrochloride followed by reaction of the aryldiazonium chloride with fluoboric acid. The preparation of benzenediazonium fluoborate by this procedure is described in detail by D. T. Flood in Organic Syntheses 13, 46 (1933).

The invention is illustrated in further detail by the following examples in which the proportions of the reactants are expressed in parts by weight unless otherwise noted.

Example I

Two hundred parts of absolute methanol is placed in a reaction vessel and the methanol is saturated with anhydrous hydrogen chloride. After flushing out the reaction vessel with nitrogen, 70 parts of nickel carbonyl is added. Sixty parts of benzenediazonium fluoborate in a separate container attached to the reaction vessel with a flexible connection is then slowly added to the reaction mixture, gas being evolved during the addition. The reaction mixture, after the addition of the benzenediazonium fluoborate is completed, is filtered to remove nickel chloride and the solvent removed from the filtrate under reduced pressure. The residue is fractionally distilled, and there is obtained 13 parts, corresponding to a 32% yield, of benzoyl fluoride, B. P. 56° C. at 1.5 mm.

Example II

Fifty parts of benzenediazonium fluoborate and 200 parts of absolute ethanol are charged into a pressure reactor, the reactor is closed, carbon monoxide introduced under 1000 atm. pressure, and the reactor heated at 80° C. for 6 hours. After cooling to room temperature, the reaction vessel is vented to remove excess carbon monoxide and gaseous reaction products. The reaction mixture is removed from the reactor and filtered, the solvent is removed from the filtrate under reduced pressure, and the residue is fractionally distilled. There is obtained 14.5 parts, 43% of theory, of benzoyl fluoride boiling at 64° C. at 4 mm. The benzoyl fluoride is identified by hydrolysis to benzoic acid.

The preparation of aromatic acyl fluorides by the process of this invention has been illustrated with particular reference to the reaction of benzenediazonium fluoborate with carbon monoxide; however, other aromatic diazonium fluoborates can be converted to the aromatic acyl fluorides in a similar manner. For example, the use of p-nitrobenzenediazonium fluoborate gives p-nitrobenzoyl fluoride, p-toluenediazonium fluoborate gives p-methylbenzoyl fluoride, o-chlorobenzenediazonium fluoborate gives o-chlorobenzoyl fluoride, and beta-naphthalenediazonium fluoborate gives beta-naphthoyl fluoride. The substituted aryldiazonium fluoborates are readily obtainable from the corresponding substituted aromatic amines, hence the process of this invention is well adapted to the preparation of the corresponding substituted aromatic acyl fluorides as well as the unsubstituted aroyl fluorides, such as benzoyl fluoride.

As indicated by the examples, the carbon monoxide employed in the process of this invention can be supplied as gaseous carbon monoxide under the desired pressure, or it can be generated in situ in the reaction mixture from a metal carbonyl. In addition to the nickel carbonyl of Example I, carbonyls of other metals of Group VIII, Series 4, of the Periodic Table, e. g., cobalt carbonyl, can also be used. The metal carbonyls are preferably used in a slight excess, e. g., 10–50% excess, over the amount stoichiometrically equivalent to the aryldiazonium fluoborate used.

The reaction of aryldiazonium fluoborates with carbon monoxide in gaseous form is conveniently carried out in the presence of an inert solvent. Suitable solvents include hydrocarbons, e. g., benzene and saturated aliphatic hydrocarbons; alcohols, e. g., methanol and ethanol; and ethers, such as diethyl ether, dibutyl ether, tetrahydrofuran, and dioxane. On the other hand, when the source of the carbon monoxide is a metal carbonyl it is preferable to use a polar solvent. In this case suitable solvents include alcohols, such as methanol and ethanol.

The aromatic acyl fluorides obtained by the process of this invention are useful as chemical intermediates, and are especially useful for the preparation of the corresponding aromatic carboxylic acids.

As indicated previously, the process of this invention has the advantage over the hitherto known methods for making aromatic acyl fluorides of providing a direct method for preparing such acyl fluorides. It is especially valuable for the reaction of aryldiazonium fluoborates having substituents of various types on the aromatic ring since the substituted aryldiazonium fluoborates can readily be prepared from the corresponding substituted aromatic amino or nitro compounds.

As many apparently widely different embodiments of this invention may be made without departing from the spirit and scope thereof, it is to be understood that this invention is not limited to the specific embodiments thereof except as defined in the appended claims.

I claim:

1. A method for preparing an aromatic acyl fluoride which comprises reacting under anhydrous conditions in an inert solvent an aromatic diazonium fluoborate with carbon monoxide at a temperature within the range of ordinary temperature to 125° C. and under a pressure within the range of atmospheric to 1000 atmospheres.

2. A method for preparing an aromatic acyl fluoride which comprises reacting under anhydrous conditions in an inert solvent an aromatic diazonium fluoborate with carbon monoxide at a temperature of 60° to 125° C. and under superatmospheric pressure of 200 to 1000 atmospheres.

3. A method for preparing an aroyl fluoride which comprises reacting under anhydrous conditions in an inert solvent an aryldiazonium fluoborate with carbon monoxide at a temperature within the range of ordinary temperature to 125° C. and under a pressure of 200 to 1000 atmospheres.

4. A method for preparing an aroyl fluoride which comprises reacting under anhydrous conditions in an inert solvent an aryldiazonium fluoborate with carbon monoxide at a temperature of 60° to 125° C. and under superatmospheric pressure of 200 to 1000 atmospheres.

5. A method for preparing benzoyl fluoride which comprises reacting under anhydrous conditions in an inert solvent benzenediazonium fluoborate with carbon monoxide at a temperature within the range of ordinary temperature to 125° C. and under a pressure within the range of atmospheric to 1000 atmospheres.

6. A method for preparing benzoyl fluoride which comprises reacting under anhydrous conditions in an inert alcohol solvent benzenediazonium fluoborate with carbon monoxide at a temperature of 60° to 125° C. under superatmospheric pressure of 200 to 1000 atmospheres.

7. A method for preparing an aromatic acyl fluoride which comprises reacting under anhydrous conditions in an inert polar solvent an aromatic diazonium fluoborate with carbon monoxide formed in situ from a metal carbonyl and an anhydrous acid at a temperature within the range of ordinary temperature to 125° C. and under a pressure within the range of atmospheric to 1000 atmospheres.

8. A method for preparing an aroyl fluoride which comprises reacting under anhydrous conditions in an inert polar solvent an aryldiazonium fluorborate with carbon monoxide formed in situ from nickel carbonyl and an anhydrous acid at a temperature within the range of ordinary temperature to 125° C. and under a pressure within the range of atmospheric to 1000 atmospheres.

9. A method for preparing benzoyl fluoride which comprises reacting under anhydrous conditions in an inert alcohol solvent benzenediazonium fluoborate with carbon monoxide formed in situ from nickel carbonyl and anhydrous hydrochloric acid at a temperature within the range of ordinary temperature to 125° C. and under a pressure within the range of atmospheric to 1000 atmospheres.

ROBERT G. LINVILLE.

REFERENCES CITED

The following references are of record in the file of this patent:

FOREIGN PATENTS

| Number | Country | Date |
| --- | --- | --- |
| 308,666 | Great Britain | June 5, 1930 |

OTHER REFERENCES

Vosnesenskii, Chemical Abstracts, page 8379$^5$ (1938).